United States Patent
Choi (10) Patent No.: US 9,859,979 B2
(45) Date of Patent: Jan. 2, 2018

(54) LIGHTING DEVICE, LIGHTING SYSTEM, AND METHOD FOR REGISTERING LIGHTING DEVICE

(71) Applicant: LG Innotek Co., Ltd., Seoul (KR)

(72) Inventor: Jin Soo Choi, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 48 days.

(21) Appl. No.: 14/902,528

(22) PCT Filed: Jun. 27, 2014

(86) PCT No.: PCT/KR2014/005772
§ 371 (c)(1),
(2) Date: Dec. 31, 2015

(87) PCT Pub. No.: WO2015/002414
PCT Pub. Date: Jan. 8, 2015

(65) Prior Publication Data
US 2016/0381766 A1    Dec. 29, 2016

(30) Foreign Application Priority Data

Jul. 2, 2013  (KR) ........................ 10-2013-0077451

(51) Int. Cl.
*H04B 10/116* (2013.01)
*H05B 37/02* (2006.01)
*H04L 29/12* (2006.01)

(52) U.S. Cl.
CPC ....... *H04B 10/116* (2013.01); *H05B 37/0245* (2013.01); *H05B 37/0272* (2013.01); *H04L 61/6022* (2013.01)

(58) Field of Classification Search
CPC ... H04B 10/11–10/116; H05B 37/0272; H05B 37/0245
See application file for complete search history.

(56) References Cited

U.S. PATENT DOCUMENTS

| 8,295,705 | B2 | 10/2012 | Kim et al. |
| 8,334,901 | B1 | 12/2012 | Ganick et al. |

(Continued)

FOREIGN PATENT DOCUMENTS

| JP | 2009-206620 A | * | 9/2009 | ............ Y02B 20/40 |
| KR | 10-2008-0076037 A | | 8/2008 | |

(Continued)

OTHER PUBLICATIONS

Office Action dated Nov. 11, 2014 in Korean Application No. 10-2013-0077451.

(Continued)

*Primary Examiner* — David Payne
*Assistant Examiner* — Casey Kretzer
(74) *Attorney, Agent, or Firm* — Saliwanchik, Lloyd & Eisenschenk (57) ABSTRACT

A lighting device, according to one embodiment, comprises: a control unit for generating an on and off signal on the basis of information on a unique address; and a light source which emits light by the on and off signal generated through the control unit, and which emits visible light including the address information. According to the present embodiment, a user can arrange, under a desired lighting device to be registered, a device having map information on a place at which the lighting device is installed, and can receive a unique address transmitted by the lighting device by using visible light communication (VLC) according to the arranged device, thereby enabling the unique address of the lighting device to be easily confirmed even without the need for dismantling the lighting device installed on the ceiling.

2 Claims, 5 Drawing Sheets (56) References Cited

U.S. PATENT DOCUMENTS

| | | | |
|---|---|---|---|
| 2011/0000422 A1 | 1/2011 | Uribe et al. | |
| 2012/0091896 A1 | 4/2012 | Schenk et al. | |
| 2012/0235579 A1 | 9/2012 | Chemel et al. | |
| 2013/0027576 A1* | 1/2013 | Ryan | H04N 5/3532 348/222.1 |
| 2014/0070706 A1* | 3/2014 | Fushimi | H05B 33/0863 315/131 |

FOREIGN PATENT DOCUMENTS

| | | |
|---|---|---|
| KR | 10-2011-0031082 A | 3/2011 |
| KR | 10-2011-0037820 A | 4/2011 |
| KR | 10-2012-0018760 A | 3/2012 |

OTHER PUBLICATIONS

International Search Report in International Application No. PCT/KR2014/005772.

\* cited by examiner

LIGHTING DEVICE, LIGHTING SYSTEM, AND METHOD FOR REGISTERING LIGHTING DEVICE

CROSS-REFERENCE TO RELATED APPLICATIONS

This application is the U.S. national stage application of International Patent Application No. PCT/KR2014/005772, filed Jun. 27, 2014, which claims priority to Korean Application No. 10-2013-0077451, filed Jul. 2, 2013, the disclosures of each of which are incorporated herein by reference in their entirety.

TECHNICAL FIELD

The present invention relates to a lighting device and a method of registering the same.

BACKGROUND ART

In general, a lighting device is controlled by a switch.

The switch is connected with the lighting device through a cable and transmits a control signal for turning on or turning off the lighting device to the lighting device by the manual operation of a user.

However, when the lighting device is controlled using the above switch, it may be inconvenient for the mobility impaired, or children, who cannot reach to the switch, to turn on or off the lighting device.

Meanwhile, recently, wireless lighting control markets to wirelessly control lighting at offices or shops in large-scaled buildings or home have been expanded. In this case, to wirelessly control the lighting device, the lighting device must be equipped with a communication module.

Further, to control specific one among multiple lighting devices, a lighting control signal must be wirelessly transmitted to a communication module installed in the specific lighting device through a gateway device.

In this case, a user must recognize a location of the specific lighting device (to be controlled) among the multiple lighting devices and a unique address (for example, a MAC address) of the communication module installed in the specific lighting device.

Therefore, according to the related art, the installation work of a new lighting device requires a series of processes of recognizing the installation location of a new lighting device and the unique address of a communication module installed in the new lighting device, and matching the unique address of the communication module to the recognized installation location to register the new lighting device.

The process of registering the lighting device is performed by allowing a worker, who installs the lighting device, to recognize the unique address of the communication module installed in the new lighting device and personally inputs the recognized unique address.

However, if the worker makes a mistake to erroneously input the unique address of a lighting device, a user may control another lighting device instead of the specific lighting device to be controlled. Further, in this case, since the user does not know the unique address of the specific lighting device to be controlled, the user cannot control the specific lighting device to be controlled.

Therefore, in order to correct the unique address, which has been erroneously input as described above, the user must inconveniently dismantle the lighting device mounted on the ceiling to recognize the unique address from a communication module installed in the dismantled lighting device, and to register the lighting device using the recognized unique address again.

In addition, according to the related art, even when changing the location of the lighting device, which has been already mounted, additionally mounting a new lighting device, or dismantling the lighting device, the user has the problems without change.

DISCLOSURE

Technical Problem

The embodiment provides a lighting device, a lighting system, and a method of registering the lighting device, capable of more simply and easily registering the lighting device.

The objects of the present invention are not limited to the above-mentioned objects, and other objects will be clearly understood from the following description by those skilled in the art.

Technical Solution

As described above, the lighting device according to the embodiment includes a control unit to generate an on/off signal based on information on a unique address, and a light source to perform light emission through the on/off signal generated by the control unit to emit a visible light including the information on the unique address.

In addition, a lighting system according to the embodiment includes a lighting device to emit a visible light including information on the unique address of the lighting device, and a gateway system to read the information on the unique address of the lighting device out of the visible light emitted from the lighting device, and to register the lighting device using the read-out information. The gateway system receives the visible light emitted through the lighting device, and acquires information on the unique address of the lighting device from the received visible light.

In addition, a method of registering a lighting device according to the embodiment includes the steps of receiving a visible light including information on a unique address from the lighting device, extracting address information on the unique address from the received visible light, and registering the lighting device by matching the address information on the extracted unique address to an installation position of the lighting device.

Advantageous Effects

According to the present embodiment, the user can easily recognize the unique address on the lighting device without dismantling the lighting device mounted on the ceiling by providing a device having map information on a place, in which a lighting device to be controlled is mounted, under the lighting device to be controlled, and receiving the unique address from the lighting device through visible light communication (VLC).

In addition, according to the present embodiment, the procedure of registering a plurality of lighting devices can be automatically performed by using the unique addresses of the lighting devices transmitted from the lighting devices, thereby significantly reducing the time to register the lighting device and solving problems resulting from the erroneous input of the unique address.

Further, according to the present embodiment, in the installation, dismantling, or maintenance of the lighting device, the unique address can be simply recognized and registered with respect to only the relevant lighting device, thereby improving user convenience.

BEST MODE

Mode for Invention

Advantages and/or characteristics of the present invention, and solutions to accomplish them will be apparently comprehended by those skilled in the art when making reference to embodiments in the following description and accompanying drawings. However, the present invention is not limited to the following disclosed embodiments, but will be realized as various modifications. The present embodiments are provided to make the disclosure of the present invention perfect and to make those skilled in the art perfectly comprehend the scope of the present invention. The present invention is defined only within the scope of claims. Hereinafter, the same reference numerals will be assigned to the same elements throughout the whole specification.

In the following description of the present embodiment, the detailed descriptions of well-known techniques incorporated herein may be omitted when they make the subject matter rather unclear. In addition, terms to be described herein are defined based on functions of components according to the embodiment of the present invention, and may have meanings varying according to the intentions of a user or an operator and the custom in the field of art. Accordingly, the terms should be defined based on the whole context throughout the present specification.

Hereinafter, a lighting device according to the present embodiment will be described with reference to FIGS. 1 to 5.

Figure 1:
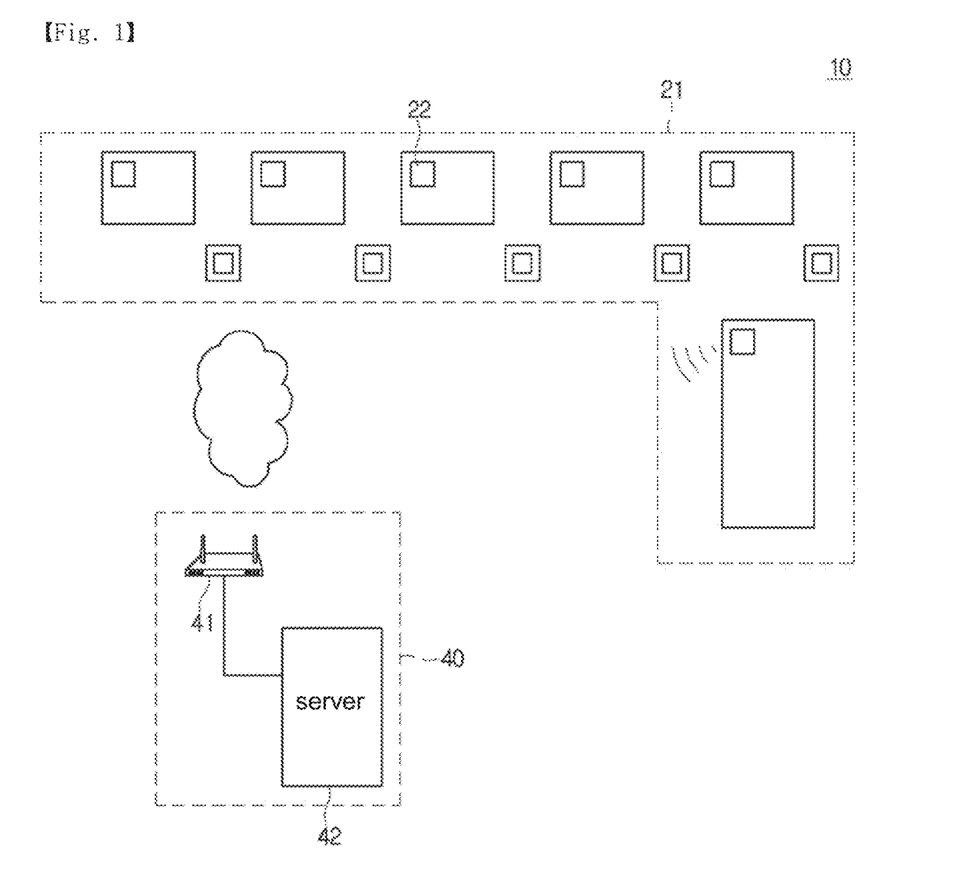
FIG. 1 is a block diagram showing a lighting system according to the present embodiment.
Figure 2:
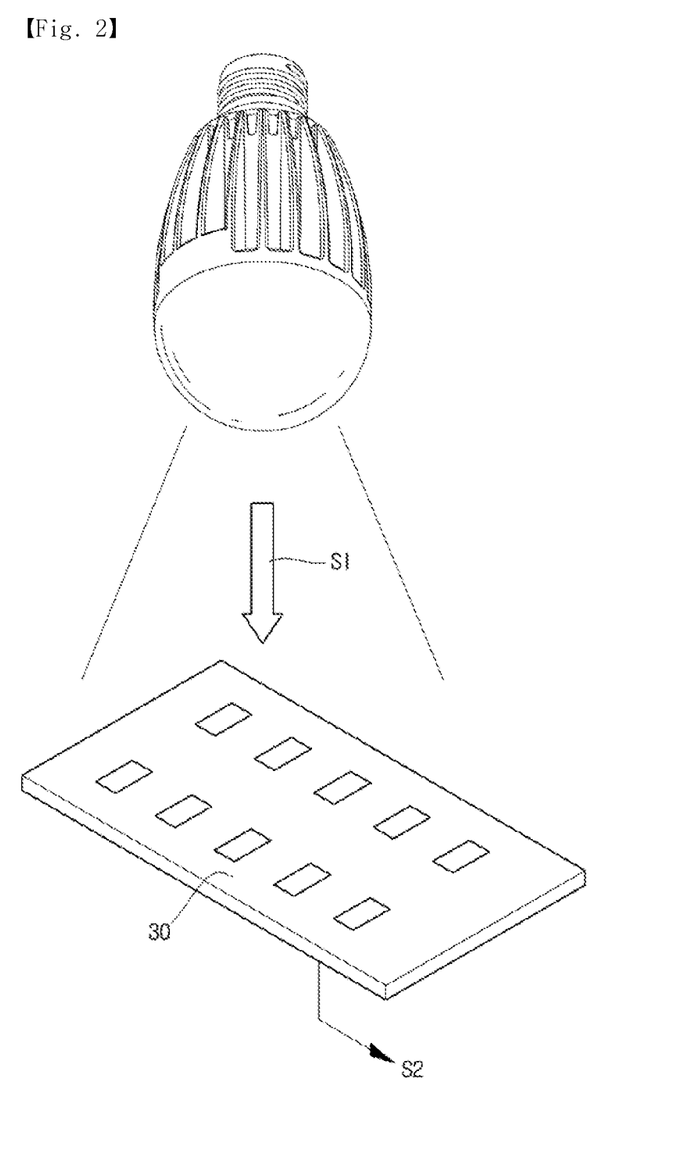
FIG. 2 is a view to explain a method of registering the lighting device shown in FIG. 1.
Figure 3:
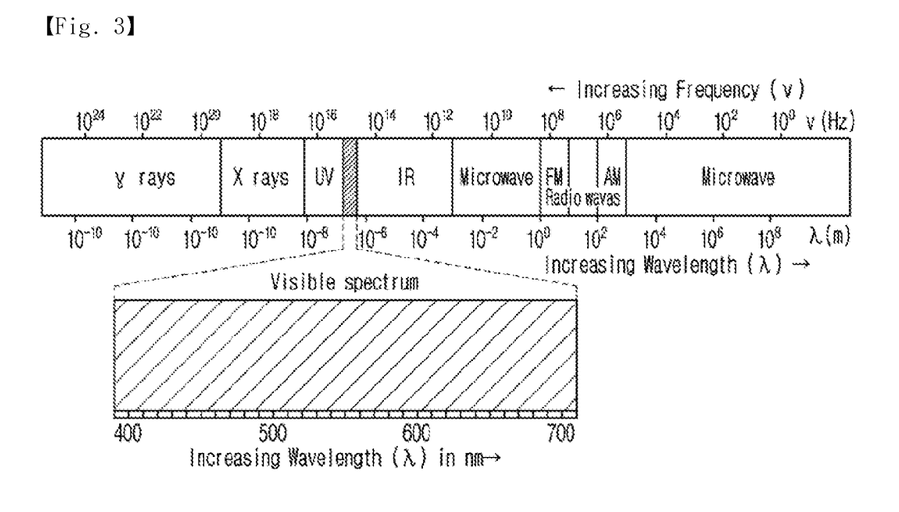
FIG. 3 is a view showing a signal spectrum transmitted from the lighting device shown in FIG. 1.
Figure 4:
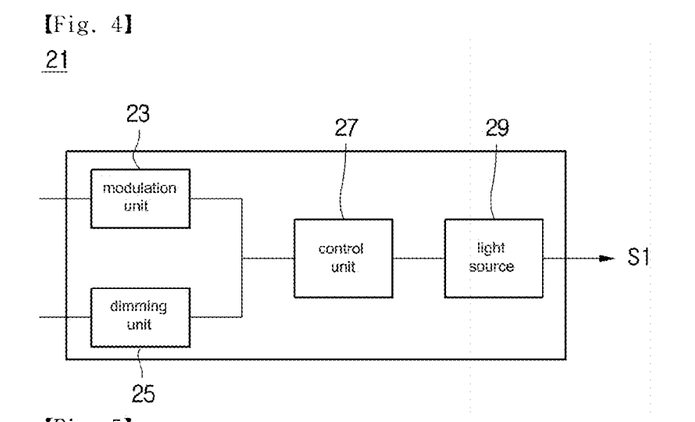
FIG. 4 is a block diagram showing a receiver according to the present embodiment.
Figure 5:
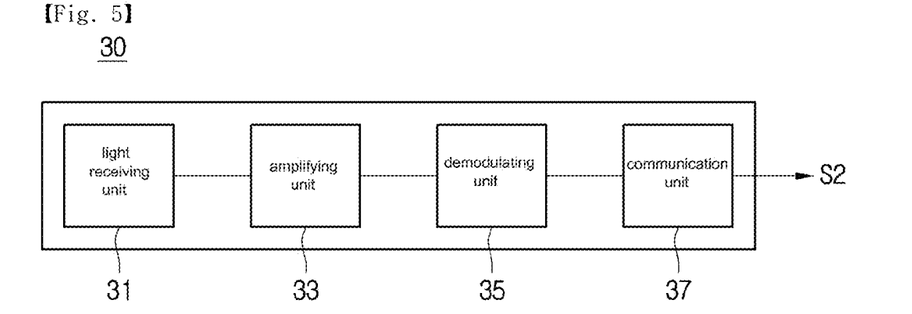
FIG. 5 is a block diagram showing the lighting device according to the present embodiment.

FIG. 1 is a block diagram showing a lighting system according to the present embodiment. FIG. 2 is a view to explain a method of registering the lighting device shown in FIG. 1. FIG. 3 is a view showing a signal spectrum transmitted from the lighting device shown in FIG. 1. FIG. 4 is a block diagram showing a receiver according to the present embodiment. FIG. 5 is a block diagram showing the lighting device according to the present embodiment.

A lighting system 10 includes a gateway system 40 and a lighting device 21. The lighting device 21 may include a plurality of lighting devices.

As shown in drawings, the gateway system 40 is connected with a lighting controller (not shown) through an external communication network. In this case, the lighting controller may include a portable terminal to transmit a control signal, which is used to control the lighting device 21, according to an operating signal by a user.

In addition, the gateway system 40 is connected with the lighting device 21 through an internal communication network.

The gateway system 40 interfaces data between the lighting device 21 and the lighting controller connected with the gateway system 40 through the external communication network.

The lighting device 21 may include a plurality of lighting devices. According to the present embodiment, eleven lighting devices 21 are shown, but the number of the lighting devices 21 is not limited to eleven. In other words, the number of the lighting devices 21 may be more increased or decreased.

Each of the lighting devices 21 is connected with the gateway system 40 through various types of networks.

In this case, the various types of networks may transceive data, which are generated between the lighting device 21 and the gateway system 40, at mutually different transmission bandwidths.

In this case, the various types of networks may employ at least one of wireless schemes, such as ZigBee, Bluetooth, Z-wave, and Wi-Fi, according to the coverage of the gateway system 40.

The lighting device 21 may be realized with one of a plurality of surface light sources, lamps, or down-lights used at an office or home.

In addition, the lighting device 21 may include a communication module 22. The communication module 22 may be connected with the gateway system 40 to wirelessly transceive data.

The configuration of the lighting device 21 will be described in detail later.

As shown in FIG. 1, the gateway system 40 may include a wireless communication unit 41 and a server 42.

The wireless communication unit 41 wirelessly transmits a control signal to the lighting device 21. The control signal is generated by the signal transmitted through the lighting controller.

The wireless communication unit 41 includes at least one gateway device.

The server 41 is connected with both of the wireless communication unit 41 and the external communication network. In addition, the server 42 stores an output signal of the lighting device 21 to be transmitted to the wireless communication unit 41. In addition, the server 42 stores the control signal transmitted thereto from the wireless communication unit 41.

The server 42 may further include a storage unit (not shown) to store an output signal and the control signal.

The server 42 may be connected with the lighting controller through a cloud network, which is the external network, to receive a signal from the lighting controller to control the lighting device 21.

The lighting system performs a procedure of registering a unique address of the lighting device 21 as shown in FIG. 2 in order to control the lighting device 21.

The procedure of registering a lighting device means procedures of recognizing the location of the lighting device 21 on a map showing the installation places of lighting devices, matching the recognized location of the lighting device 21 with the unique address of the communication module installed in the lighting device 21, and storing the result.

In this case, the unique address of the lighting device 21 may be a Media Access Control (MAC) address of the communication module installed in the lighting device 21.

The lighting device 21 stores the unique address thereof, and outputs address information S1 on the stored unique address according to an external request.

In this case, the address information S1 is carried and output by a visible light. The visible light means a light having a wavelength region, which may be detected by eyes of a human. The wavelength region is in the range of 380 nm to 700 nm.

Accordingly, a user locates the receiver 30 in a place in which the lighting device 21 is installed as shown in FIG. 2.

In addition, the receiver 30 receives the visible light output through the lighting device 21. In this case, the received visible light carries the information S1 on the address of the lighting device 21.

If receiving the visible light, the receiver 30 extracts the address information S1 carried by the received visible light, and stores and registers the unique address of the lighting device 21 using the extracted address information S1.

Referring to FIG. 3, the address information S1 is carried and output by the visible light spectrum.

The visible light emitted from the lighting device 21 has the spectrum wavelength band in the range of 400 nm to 700 nm. Accordingly, the lighting device 21 dims the light having the wavelength band based on the address information and emits the light.

The following description will be made regarding the lighting device 21 to output the address information S1 by carrying the address information S1 by the visible light.

Referring to FIG. 4, the lighting device 21 according to the present invention includes a modulation unit 23, a dimming unit 25, a control unit 27, and a light source 29.

The light source 29 may include a plurality of light emitting diodes or fluorescent lamps.

The modulating unit 23 stores the information on the unique address of the lighting device 21 and modulates the information on the stored unique address.

The dimming unit 25 receives the dimming signal from the outside, processes the dimming signal, and transmits the dimming signal to the control unit 27.

The control unit 27 receives the unique address modulated through the modulating unit 23. In addition, the control unit 27 receives the dimming signal received from the dimming unit 25.

Further, the control unit 27 generates an on/off signal for the light source 29 by processing the modulated unique address together with the received dimming signal.

The control unit 27 may include a power circuit to control the light source 29.

In this case, the on/off signal includes information on the unique address of the lighting device 21. For example, when a digital signal value of the modulated unique address is "1", an on signal may be generated by the control unit 27.

In addition, when the digital signal value of the modulated unique address is "0", the off signal may be generated by the control unit 27.

However, the present embodiment is not limited thereto. On the contrary to the generated on/off signal, when the digital signal value is "1", the off signal may be generated, and, when the digital signal value "0", the on signal may be generated.

Therefore, the light source 29 performs an on/off operation based on the on/off signal generated by the control unit 27.

Therefore, the visible light emitted from the light source 29 carries and outputs the address information S1 of the lighting device 21 in sequence according to the on and off time.

In other words, the light source 29 performs a light emission operation by distinguishing between a plurality of operating sections according to the on/off signal.

For example, when the digital signal value of the modulated unique address is '01010000', the on/off signal generated by the control unit 27 is divided into 8 on and off sections. In other words, the on/off signal generated by the control unit 27 may be divided into 8 sections including a first section having an off signal, a second section having an on signal, a third section having the off signal, a fourth section having the on signal, a fifth section having the off signal, a sixth section having the off signal, a seventh section having the off signal, and an eighth section having the off signal.

Therefore, the light source 29 performs an on/off operation according to the on/off signal. In this case, the on/off operation of the light source 29 is divided into a plurality of operating sections corresponding to the on/off signal. In other words, the on/off operation of the light source is divided eight sections.

Accordingly, the light source 29 performs an off operation in the first operating section, an on operation in the second operating section, the off operation in the third operating section, the on operation in the fourth operating section, the off operation in the fifth operating section, the off operation in the sixth operating section, the off operation in the seventh section, and the off operation in the eighth operating section.

Meanwhile, the lighting device 21 may further include the communication module 22. The communication module 22 makes communication with the gateway system 40 or another adjacent lighting device 21 to receive the control signal and to transmit the received control signal to the control unit 27.

The communication module 22 is provided therein with an antenna to receive the control signal from the outside, and to transmit the received control signal to the control unit 27.

The communication module 22 may include a communication integrated circuit to analyze the control signal according to the type of the wireless network, and may selectively have one specific communication integrated circuit among a plurality of communication integrated circuits according to a wireless network environment.

The communication integrated circuit may support at least one of communication schemes, such as ZigBee, Z-wave, Wi-Fi, and Bluetooth.

Meanwhile, the control unit 27 may generate an on/off signal not only simply including an on signal and an off signal, but also including on signals having mutually different intensities.

In other words, in the on/off signal, only one digital signal value is contained at one section. However, in this case, the power of the lighting device 21 may be consumed, and the time to perform the registration procedure of the lighting device 21 may be increased.

Accordingly, the control unit 27 generates an on/off signal having a plurality of digital signal values contained in one on/off section.

For example, the digital signal value of '00' may be generated as an off signal, and the digital signal value of '01' may be generated as an on signal having a first signal level. In addition, the digital signal value of '10' may be generated as an on signal having a second signal level higher than the first signal level, and the digital signal value of '11' may be generated as an on signal having a third signal level higher than the second signal level.

Therefore, according to the embodiment, the address information on the unique address of the lighting device may be output within a shorter period of time.

Meanwhile, the receiver 30 may have the configuration shown in FIG. 5.

Referring to FIG. 5, the receiver 30 includes a light receiving unit 31, an amplifying unit 33, a demodulating unit 35, and a communication unit 37.

The light receiving unit 31 may include a photoelectric device to receive light and output an electrical signal by performing photoelectric conversion with respect to the received light. In this case, the light receiving unit 31 may be realized with a photodiode.

In this case, the electrical signal output from the light receiving unit 31 includes information on signal intensity, and information on a signal existence state.

The amplifying unit 33 amplifies the electrical signal, which is output through the light receiving unit 31, to convert to a signal level which may be processed (recognized) in the demodulating unit 35.

The demodulating unit 35 demodulates the amplified electrical signal based on modulation codes in the modulating unit 23 of the lighting device 21.

The signal demodulated by the demodulating unit 35 means the address information S1 on the unique address of the lighting device 21. The receiver 30 registers the unique address information S1 in the lighting device 21 mounted in a specific location.

In addition, the receiver 30 includes the communication unit 37, and transmits the information S2 on the registration of the registered lighting device 21 to a gateway device through the communication unit 37.

In this case, the registration information S2 includes the information on the location of the lighting device 21 (the information on the location of the lighting device 21 placed on the map related to the installation places of the lighting device), and the information S1 on the address of the lighting device 21 acquired from the demodulated signal.

Hereinafter, the lighting device 21 shown in FIGS. 4 and 5 and the registration of the lighting device 21 having the receiver 30 will be described with reference to FIGS. 6 and 7.

Figure 6:
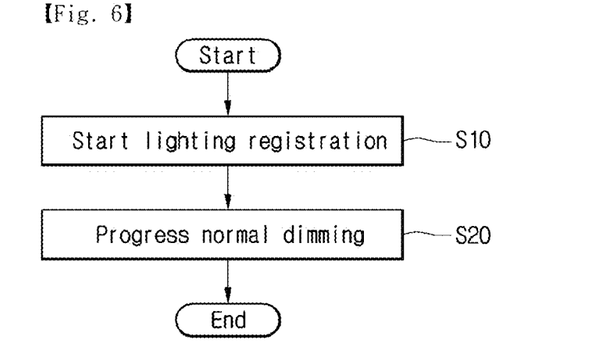
FIG. 6 is a flowchart showing the operation of the lighting device 21 according to the present invention.

FIG. 6 is a flowchart showing the operation of the lighting device 21 according to the present invention. FIG. 7 is a view showing a step of performing lighting registration according to the present invention.

Figure 7:
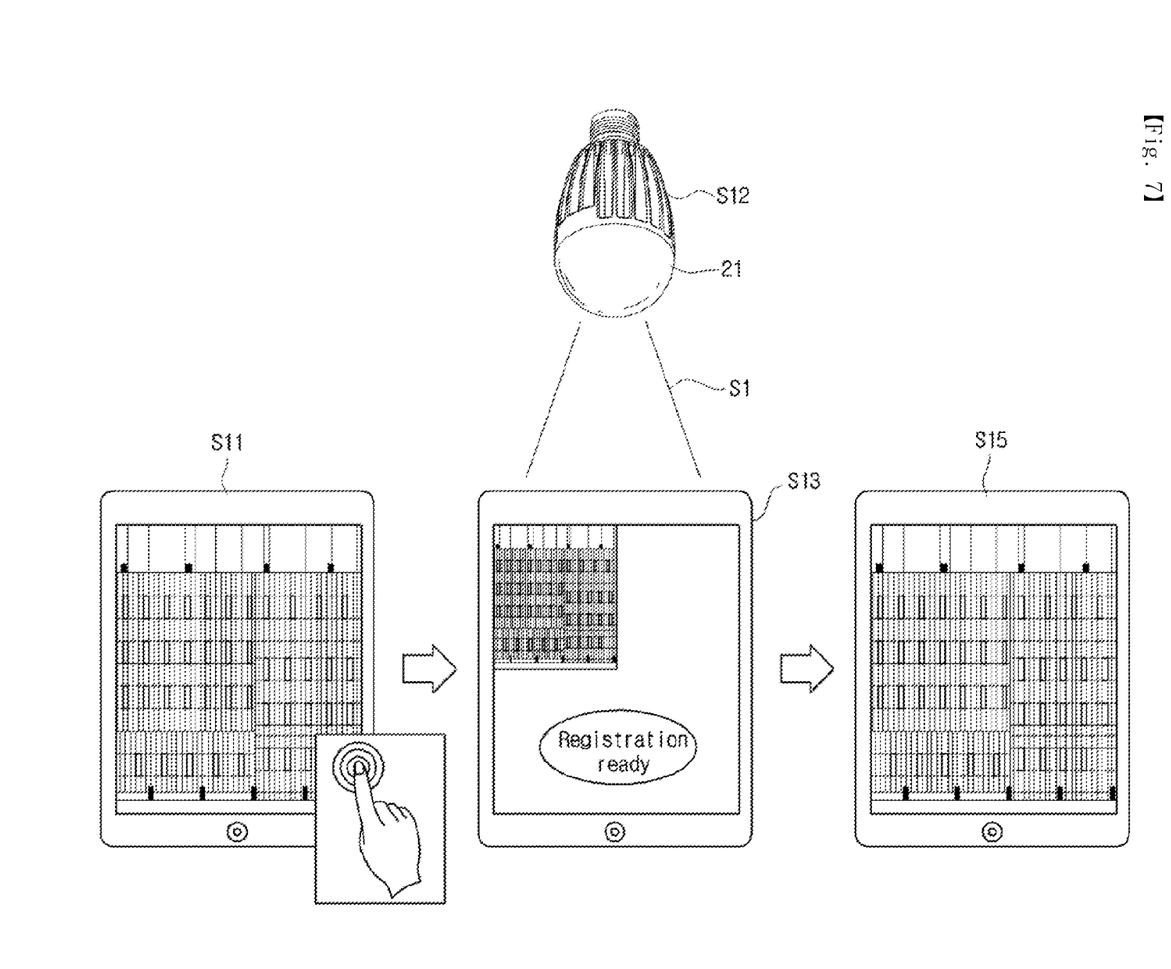
FIG. 7 is a view showing a step of performing lighting registration according to the present invention.

First, if lighting registration is started (S10), the receiver 30 is prepared as shown in FIG. 7, and selects a lighting device to be registered (S11). In addition, the receiver 30 stores a map having location information of a whole space where a plurality of lighting devices are installed. In addition, the selection of the lighting device means the selection of a specific location on the stored map.

If the specific location on the map stored in the receiver 30 is selected, the specific lighting device 21 installed at the selected location on the map emits a visible light having the information on the unique address of the lighting device 21.

In addition, the receiver 30 is provided at a predetermined distance from a real location in which the specific lighting device 21 is installed (S13). Preferably, the light receiving unit 31 of the receiver 30 is provided under the specific lighting device 21.

The receiver 30 receives the light emitted from the lighting device 21 and photoelectric-converts and demodulates the received light.

Further, the receiver 30 extracts the address information S1 of the lighting device 21 emitting the light using the demodulated signal (S15).

Next, the receiver 30 stores the information on the selected location on the map and the information S1 on the extracted address. In addition, the receiver 30 progresses the registering of the lighting device by matching the address information S1 to the location information.

In addition, when the receiver 30 includes the communication unit 37, the receiver 30 transmits the information S2 on the registration of the lighting device 21, which includes the location information and the address information S1, to a gateway device.

After the registering of the lighting device 21 has been finished, the lighting device 21 may progress light emission by normally dimming under the control of the gateway system (S20).

In other words, the gateway system may transmit a control signal to the lighting device using the registered address information S1 in order to control the registered lighting device.

In addition, when the lighting device 21 normally dims, the modulating unit 23 of the lighting device 21 does not operate, but the dimming unit 25 and the control unit 27 control the light source 29 so that the lighting device 21 may be driven identically to a typical lighting device.

Meanwhile, although the above description has been made in that the receiver 30 and the gateway system are separately provided, the receiver 30 may be included in the gateway system.

Through the above registration steps, the lighting device 21 contains the information on the address thereof into the visible light emitted from the lighting device 21, thereby preventing a user from personally recognizing the information S1 on the address of the lighting device 21 by observing the lighting device 21, and thus inputting the recognized information on the address of the lighting device 21.

According to the present embodiment, the user can easily recognize the unique address on the lighting device without dismantling the lighting device mounted on the ceiling by providing a device having map information on a place, in which a lighting device to be controlled is mounted, under the lighting device to be controlled to receive the unique address from the lighting device through visible light communication (VLC).

In addition, according to the present embodiment, the procedure of registering a plurality of lighting devices can be automatically performed by using the unique addresses of the lighting devices transmitted from the lighting devices, thereby significantly reducing the time to register the lighting device and solving problems resulting from the erroneous input of the unique addresses.

Further, according to the present embodiment, in the installation, dismantling, or maintenance of the lighting device, the unique address can be simply recognized and registered with respect to only the relevant lighting device, thereby improving user convenience.

The invention claimed is:
1. A lighting device comprising:
  a communication module adapted to connect with a gateway system through a communication network and receive a control signal from the gateway system;
  a light source adapted to emit a visible light including address information of the lighting device; and a power circuit adapted to generate an on/off signal of the light source based on the address information of the lighting device and to control the light source based on the on/off signal;

wherein the light source performs light emission according to the on/off signal, wherein the address information is a MAC address of the communication module installed in the lighting device, wherein the power circuit generates the on/off signal when a location of the lighting device to be registered from a map including spatial information on installation locations of a plurality of lighting devices is selected, wherein the light source performs light emission by dimming based on a control signal transmitted from the gateway system when the lighting device is registered, wherein the generated on/off signal is divided into a plurality of sections, wherein the light source emits the visible light by distinguishing between a plurality of operation sections according to the on/off signal divided into the sections, and wherein the on/off signal has a pulse width varying depending on the address information.

2. A lighting system comprising:

a lighting device that emits a visible light including information on an address of the lighting device, and a gateway system to read the information on the address of the lighting device out of the visible light emitted by the lighting device, and to register the lighting device via the read-out information, wherein the gateway system comprises a receiver that receives the visible light emitted by the lighting device, and acquires the information on the address of the lighting device from the received visible light;

wherein the lighting device comprises;

a communication module adapted to connect with the gateway system through a communication network and receive a control signal from the gateway system;

a light source adapted to emit the visible light including the address information of the lighting device; and a power circuit adapted to generate an on/off signal of the light source based on the address information of the lighting device and to control the light source based on the on/off signal;

wherein the light source performs light emission according to the on/off signal, wherein the address information is a MAC address of the communication module installed in the lighting device, wherein the power circuit generates the on/off signal when a location of the lighting device to be registered from a map including spatial information on installation locations of a plurality of lighting devices is selected, wherein the light source performs light emission by dimming based on a control signal transmitted from the gateway system when the lighting device is registered, wherein the generated on/off signal is divided into a plurality of sections, wherein the light source emits the visible light by distinguishing between a plurality of operation sections according to the on/off signal divided into the sections, and wherein the on/off signal has a pulse width varying depending on the information on the address.

* * * * *